Feb. 17, 1970     K. F. DE FOR     3,495,992
PROCESS AND APPARATUS FOR FORMING AND PACKAGING FOOD PRODUCTS
Filed Oct. 12, 1964
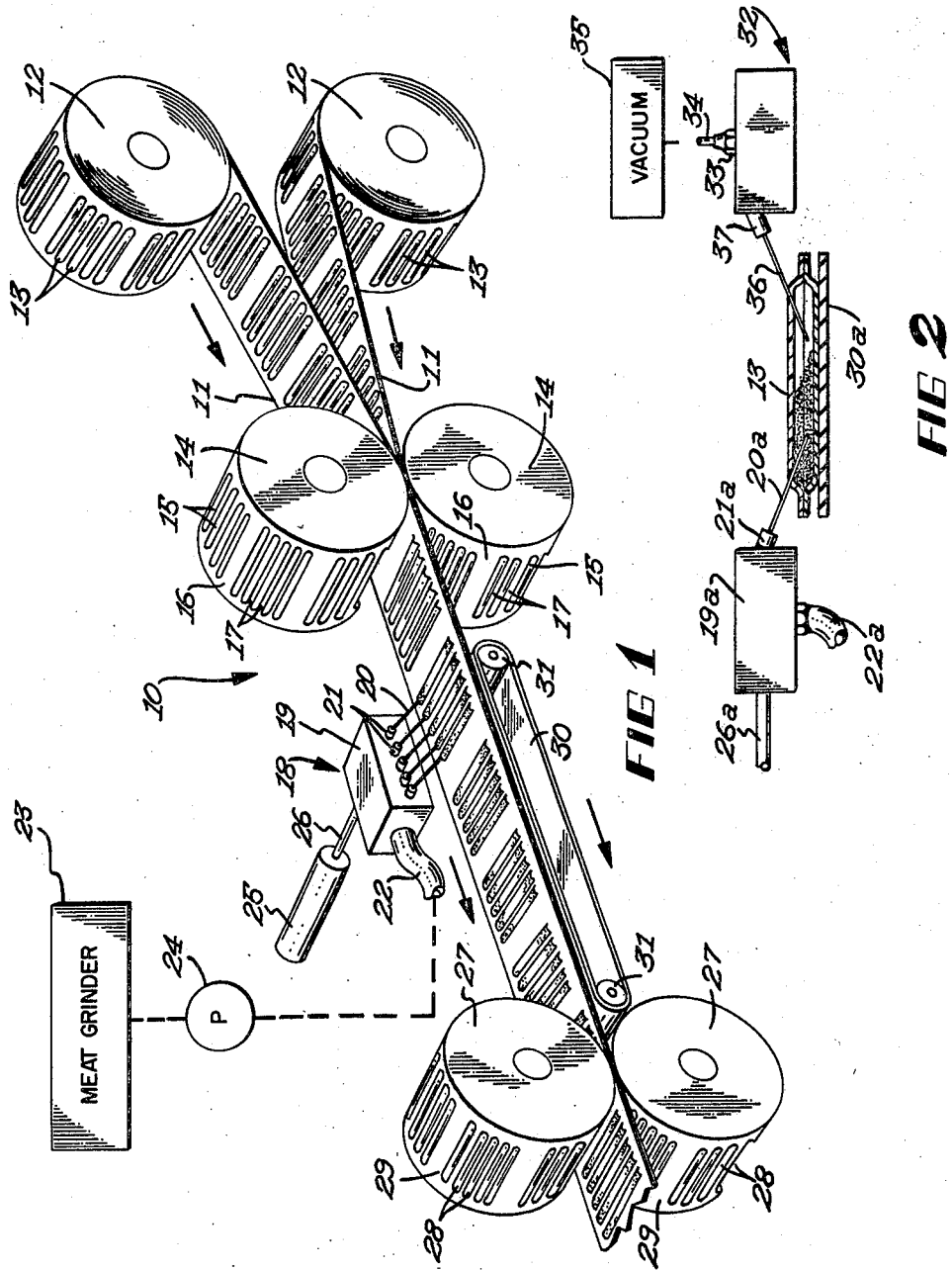
INVENTOR.
KENNETH F. DE FOR
BY Williamson & Palmatier
ATTORNEYS

United States Patent Office 3,495,992
Patented Feb. 17, 1970

3,495,992
PROCESS AND APPARATUS FOR FORMING AND PACKAGING FOOD PRODUCTS
Kenneth F. De For, 1909 4th Ave. SW., Austin, Minn. 55912
Filed Oct. 12, 1964, Ser. No. 403,148
Int. Cl. B65b 25/06, 43/00
U.S. Cl. 99—171
7 Claims

ABSTRACT OF THE DISCLOSURE

A process and apparatus for forming and packaging a raw flowable product wherein a pair of webs of plastic packaging material each having a plurality of spaced apart similar concavities or heat sealed together to form multi-cell packaging units. Simultaneously puncturing and inserting a plurality of product dispensing elements connected to a source of raw flowable food products into the packaging cells of each unit, then simultaneously dispensing the flowable food product into the cells to completely fill the same. Removing the product dispensing elements from the filled cells of each packaging unit and heat sealing the opening formed in the cells. Then heating the packaged food product to at least partially cooked product.

This invention relates to process and apparatus for packaging food products.

It has been found that in order to substantially reduce bacterial contamination of certain food products and especially meat products, it is desirable to minimize handling of the products either mechanically or manually during the formation and processing of such products prior and up to the time they are packaged. In many instances, certain products must be processed to render them capable of being subsequently handled for packaging and ultimate use by a consumer. Such products include the various sausage products which are formed from comminuted flowable material and which heretofore have required processing to render the same dimensionally stable before such products could be packaged. This processing and subsequent packaging operation renders the products susceptible to contamination.

Another problem relating to certain packaged food products such as meats and the like is that quite often these products are packaged in a group so that when the packages are opened by the consumer, these packages are again subjected to contamination unless they are consumed fairly soon after the package has been opened. Although the opened package is stored in a refrigerated environment, the food products are still susceptible to spoilage.

It is therefore a general object of this invention to provide a method and apparatus for forming and packaging a flowable food product such as meat or the like into a multi-cell package and where each individual product is sealed from each other in such a package.

A more specific object of this invention is to provide a high capacity process and apparatus for forming and packaging a food product in which a multi-cell package is formed by moving a pair of similar webs formed of impervious plastic material through a predetermined path of travel and wherein each web has a plurality of spaced-apart similar concavities therein, and during such movement bringing the webs into contacting relation with each other to permit these webs to be sealingly joined together so that a multi-cell package is formed, and thereafter dispensing a flowable food product into each cell so that it is substanially filled, and then subsequently heating the packaged product to preferably render the same dimensionally stable and to destroy any bacteria within the product.

A further object of this invention is to provide a process and apparatus of the class described in which a plurality of food products may be effectively and economically packaged in a multi-cell package while minimizing contamination of the product during the packaging operation, but which process and apparatus also allows each product to be sealed from one another in a multi-cell package, and which further permits production of a product containing package which is highly attractive and therefore enhances its customer appeal.

These and other objects and advantages of the invention will more fully appear from the following description made in connection with the accompanying drawings, wherein like character references refer to the same or similar parts throughout the several views, and in which:

FIG. 1 is a diagrammatic perspective view of an apparatus system which may be advantageously used in the practice of this process; and FIG. 2 is a diagrammatic elevational view illustrating a modified form of the product dispensing mechanism and with a single cell of a multi-cell package illustrated in section.

Referring now to the drawings, and more specifically to FIG. 1, it will be seen that one embodiment of an apparatus system, designated generally by the reference numeral 10 and which may be used to practice the present process, is there shown. In one embodiment of the present invention, it is contemplated that the package be formed from a suitable packaging material, preferably plastic or the like prior to the introduction of the product into the package and while the product is in the raw or uncooked condition. Thereafter the packaged product is subjected to heat which is sufficiently high enough to destroy any bacteria within the raw product and to render the product dimensionally stable. In the event that some kind of plastic is used as the packaging material, the heat to which the packaged product will be subjected will be substantially below the deformation temperature of the plastic material.

Two webs 11 of a suitable moisture impervious plastic material such as laminated Mylar saran polyethylene or laminated polyethylene cellophane saran are moved through a pre-determined path of travel. The webs 11 are unwound from suitable rolls 12 of such material and each web has a plurality of concavities 13 formed in one surface thereof and these concavities are arranged in groups, each group being spaced apart from the next adjacent group. It is pointed out that the webs 11 are drivingly moved and in such travel are moved into contacting relation with respect to each other. It will also be noted that the concavities 13 extend transversely of the webs and the concavities of each group are arranged in side-by-side relation with respect to each other. These concavities terminate closely adjacent but short of the longitudinal edges of the webs and the concavities of the upper web 11 are formed in the lower surface thereof and face downwardly while the concavities in the lower web are formed in the upper surface thereof and face upwardly. In the embodiment shown, the webs 11 are moved in their predetermined path of travel while oriented substantially horizontally during the package forming and filling operation.

Means are provided for not only bringing the webs 11 into contacting relation with respect to each other but for also heat sealing these webs together so that a multi-cell package is formed. This means includes a pair of heat sealing drums 14 each suitably driven by drive means to unwind the webs 11 from the rolls of such web material.

Each of the drums 14 have a plurality of concavities 15 in the circumferential surface thereof, these concavities being arranged in groups corresponding to the groups of concavities in the webs 11. Although not shown in the drawing, the annular or circumferential surface portion 16 of each drum adjacent the respective ends thereof are in rolling contact with each other and heating elements are provided for heating the edge surfaces of the webs so that these longitudinal edges of the two webs 11 are heat sealed together. Similarly, the surfaces 17 which extend between adjacent concavities 15 of each group also are provided with heat sealing elements whereby those portions of each web located between each concavity may also be heat sealed together.

It will therefore be noted that as the webs 11 pass between the heat sealing drums 14, the webs will not only be brought into contacting relation with respect to each other but these webs will be fused together in a heat sealing operation to form multi-cell packages or groups. To this end, it is pointed out that the webs 11 will be pased through or between the heat sealing drums 14 so that the concavities 13 of each web are received within the concavities in the associated drum and so that the concavities of one web are disposed in opposed and registering relation with respect to the concavities of the other web. Thus it will be seen that each opposing registering pair of concavities 13 will define a packaging cell which is completely sealed from the exterior and which is also campletely sealed from the next adjacent cell. Therefore this package forming operation permits these multi-cell packaging units to be continuously formed and it is pointed out that the concavities may be preformed as illustrated, or may be formed in a forming operation which could be incorporated in the packaging system 10.

After the packages have been formed, the next step in the forming and packaging operation is the dispensing of the product to be packaged within the completely sealed packaging cells. The material dispensing mechanism designated generally by the reference numeral 18 comprises a material dispensing head 19 having a plurality of dispensing needles or elements 20 connected thereto by suitable fittings 21. The dispensing head 19 is connected by a conduit 22 to a suitable source of flowable comminuted meat material 23 and a pump 24 is interposed in flow controlling relation with respect to the conduit 22. The comminuted flowable meat product may constitute an accumulation tank or may comprise a meat grinder, as shown, so that after the meat has been suitably comminuted to the desired size, this flowable meat product will then be continuously supplied to the dispensing head 19 by action of the pump 24.

In order to affectively fill the multi-cell packaging units as the latter are moved by the dispensing mechanism 18, it is necessary that the hollow dispensing needles penetrate the cells of each packaging unit and be removed therefrom at the end of the dispensing operation. In order to permit simultaneous insertion of these needles into the sealed packaging cells, means are provided for shifting the dispensing mechanism 18 towards and away from the multi-cell packaging units as they are moved in position for filling. This means includes a fluid pressure cylinder 25 which is provided with a conventional piston and piston rod 26, the latter having its outermost end attached to the dispensing head 19. This fluid pressure unit may be either hydraulically or pneumatically operated and when the piston rod 26 is extended, the dispensing needles 20 will be moved to simultaneously penetrate the various packaging cells of the packaging unit. In the embodiment shown, it is desirable that the dispensing needles 20 be moved so that the dispensing ends thereof are in close proximity to the opposite ends of the packaging cells. During the dispensing operation, the dispensing head and dispensing needles 20 will be retracted while simultaneously dispensing the flowable meat material into the packaging cells thus permitting highly effective and complete filling of each cell.

At this point of the operation, the product will be completely packaged even though the product is in the raw condition and is therefore not dimensionally stable. Therefore subsequent treatment of the packaged product is necessary to render the same stable but it is pointed out that any smoking operation to smoke the meat product would in many instances be ineffective since the plastic web packaging material if not completely gas impervious is substantially impervious to gases. However, smoke flavoring may be added to the comminuted meat product to provide the necessary flavor as is well known in the art.

The completely filled multi-cell packaging units are thereafter moved in their path of travel between a second pair of heat sealing drums 27 each provided with a plurality of recesses 28 and having heating elements arranged to seal the openings in each packaging cell formed by the penetration of the dispensing needles 20. To this end, the embodiment illustrated in FIG. 1 will have a heat sealing surface 29 arranged circumferentially adjacent one end of the uppermost drum 27, so that the material surrounding the opening formed by the penetration of the dispensing needles 20 will be heated to fuse the plastic material and close such an opening. A suitable endless apron conveyor 30 trained about a pair of rollers 31 supports the product containing multi-cell packages as the same are moved from the filling station towards the final sealing station. Therefore the belt is driven by that roller 31 which is located adjacent the heat sealing drums 27.

It is also pointed out that during the material filling operation it is preferable that the package forming webs as well as the multi-cell packages formed therefrom have their movement interrupted. It will therefore be noted that the present system contemplates continual although intermittent operations.

After the packaging cells have been completely filled, these packaging cells are thereafter directed to a heating chamber wherein the packaged products are subjected to a temperature within the range of 135° and 170° F., and preferably at a temperature of approximately 170° F. for approximately fifteen minutes duration. This degree of heat at least partially cooks the meat products so that the same are rendered dimensionally stable and will retain its shape when removed from its packaging cell.

Referring now to FIG. 2, an alternative method of filling the multi-cell packaging unit is there illustrated. In this modified form, the material dispensing mechanism also includes a material dispensing head 19a which is provided with a plurality of dispensing elements or needles 20a connected thereto by suitable fittings 21a in the manner of the mechanism illustrated in FIG. 1. The dispensing head 19a is connected to the source of flowable comminuted meat material by a conduit 22a so that the meat product will be continuously supplied to the dispensing head 19a. The dispensing needles 20a in operation are capable of and do simultaneously penetrate or puncture the packaging cells so that the distal or dispensing end of each of the hollow dispensing needles is positioned intermediate the ends of one of the packaging cells. During the dispensing operation, the dispensing head and the hollow dispensing needles carried thereby will be retracted while simultaneously dispensing the flowable meat product into the packaging cells. It will be appreciated that since the embodiment of the apparatus illustrated in FIG. 2 is illustrated in elevation, the plurality of needles carried by the dispensing head 19a are not illustrated.

In the alternative method of filling the packaging cells illustrated in FIG. 2, means are provided which cooperate with the manifold dispensing head 19a for positively assuring that the respective ends of the cells remotely located with respect to the material dispensing head will be completely filled. This means includes a manifold vacuum head 32 which is connected by a fitting 33 to a conduit 34. This conduit 34 is connected at its other end to a source of negative pressure or vacuum which may be a conventional evacuation pump 35, diagrammatically illustrated. A plurality of hollow vacuum needles or elements 36 arranged in side-by-side relation are connected to the manifold vacuum head 32 by means of suitable fittings 37. These vacuum needles 36 are similar in construction to the dispensing needles 20a of the material dispensing mechanism and each vacuum needle penetrates one of the packaging cells so that the distal or intake end of the needle is disposed intermediate the ends of the packaging cell which it has penetrated. Although not shown in the drawings, means may be provided for shifting the manifold vacuum head to permit simultaneous penetration of the plurality of vacuum needles thereof to the desired degree into the packaging cells of a multi-cell packaging unit. Simultaneous penetration or insertion of the needles into the packaging cells of a packaging unit occurs prior to the dispensing of the flowable food product through the hollow dispensing needles 20a. During the filling operation, the vacuum needles 36 are also retracted and simultaneously produces a negative pressure within the packaging cells in which they are located so that the flowable meat product will completely fill the cell as it is dispensed from the dispensing head 19a. A suitable apron conveyor 30a may be provided to support the multi-cell packaging units during this operation and this apron conveyor may be of similar construction to that illustrated in FIG. 1.

Inasmuch as two small openings will be produced in each end of each packaging cell, it is preferred that the filled multi-cell units be passed between a pair of heat sealing drums similar to the heat sealing drums 27 of FIG. 1 but in which opposite circumferential end portions of the uppermost drum is provided with heat sealing elements so that these openings may be closed in a heat sealing operation. The packaged products will also be subjected to heat treatment for rendering the same dimensionally stable as in the embodiment illustrated in FIG. 1.

After subsequent partial cooking of the packaged products, those portions of the packaging material located between adjacent packaging units may be severed by a suitable severing mechanism. The packaging units may also be labeled or subjected to additional processing that may be required to prepare such packages for merchandising. The above described method and apparatus system for forming and filling packages with a meat product minimizes handling, either mechanically or manually, of the product as it is processed and packaged for the consumer. Since the product is placed in the package prior to the heat treatment process for rendering the product dimensionally stable, there is little, if any, chance of the packaged product becoming contaminated after this heating operation, which operation destroys the bacteria within the product. Further by completely sealing one product from another within each multi-cell packaging unit, the removal of one or a plurality of such products from the package by a consumer does not necessarily increase the chances of contamination of those products remaining in the package as does the conventional packages for similar products.

The present method of packaging a flowable food product while the product is in a substantially raw condition is also applicable to other food products than flowable comminuted meat. For example, ice cream and gelatins while in the flowable state may be introduced into the ultimate consumer package prior to completion of the treatment of these products which would require cooling to cause the ice cream to freeze and the gelatin to jell. Similarly, baked goods such as bread and the like as well as lard could be introduced in the ultimate consumer package while the products are in the raw condition and in a flowable state. There after these products could be heated or cooled as the case may be to produce the desired dimensional stability. Jellies and other products could also be packaged and subsequently treated while in the consumer package in a similar manner.

Thus it will be seen that I have provided a process and apparatus system which is capable of high capacity production in the packaging of food products such as comminuted meats and the like and which packaging operation allows these products to be packaged in a highly sanitary manner and in very attractive consumer packages. The flexibility of the plastic packaging material facilitates handling of the packaged products and this plastic packaging material also permits better customer inspection as is well known in the art.

Therefore the present apparatus system and process for packaging of flowable food products such as comminuted meat, not only permits packaging of the products with the conventional packaging materials but permits the packaging operation to be done in a more sanitary manner and also serves to increase the life of the packaged product even when the multi-cell package is opened by the consumer.

It will, of course, be understood that various changes may be made in the form, details, arrangement and proportions of the various parts without departing from the scope of my invention.

What is claimed is:

1. Process for forming and packaging a raw flowable food product comprising:
    moving a pair of similar elongate webs of flexible substantially impervious, plastic packaging material through a predetermined path of travel, each web having a plurality of spaced-apart similar concavities in one surface thereof spaced inwardly of the longitudinal marginal edges of the webs,
    bringing said webs into contacting relation with each other so that each concavity of one web faces and registers with the concavity of the other web and defines therewith a packaging cell,
    heat sealing the contacting marginal portions of the webs together and also heat sealing together those portions of the webs which circumscribe each pair of registering concavities to seal each packaging cell from each other and to continually produce multi-cell packaging units,
    inserting into each cell a product dispensing member which is connected to a source of raw flowable food product, and dispensing the flowable product simultaneously into a plurality of cells to completely fill the same,
    and removing the product disposing member and engaging each cell with a heat sealing medium adjacent the opening of the cell through which the product dispensing member passed to thereby close said opening.

2. Process for forming and packaging a raw flowable food product comprising
    moving a pair of similar elongate webs of flexible substantially impervious, plastic packaging material through a predetermined path of travel, each web having a plurality of spaced-apart similar concavities in one surface thereof spaced inwardly of the longitudinal marginal edges of the webs,
    bringing said webs into contacting relation with each other so that each concavity of one web faces and registers with a concavity of the other web and defines therewith a packaging cell, heat sealing the contacting marginal portions of the webs together and also heat sealing together those portions of the webs which circumscribe each pair of registering concavities to seal each packaging cell from each other and to continually produce multi-cell packaging units,
    inserting into each cell a product dispensing member which is connected to a source of raw flowable food product, and dispensing the flowable product in the cells to completely fill the same, removing the product dispensing member and engaging each cell with a heat sealing medium adjacent the opening of the cell through which the product dispensing member passed, to thereby close said opening and thereafter heating said packaged products to at least partially cook the same.

3. The process as defined in claim 2 wherein said packaged products are heated to within the range of 135° and 170° F. for approximately fifteen minutes.

4. Process for forming and packaging a raw flowable food product comprising:

moving a pair of similar elongate webs of flexible substantially impervious, plastic packaging material through a predetermined path of travel, each web having a plurality of spaced-apart similar concavities in one surface thereof spaced inwardly of the longitudinal marginal edges of the webs, bringing said webs into contacting relation with each other so that each concavity of one web faces and registers with the concavity of the other web and defines therewith a packaging cell, heat sealing the contacting marginal portions of the webs together and also heat sealing together those portions of the webs which circumscribe each pair of registering concavities to seal each packaging cell from each other and to produce multicell packaging units, simultaneously puncturing and inserting a plurality of products dispensing elements connected to a source of raw flowable food product into a plurality of packaging cells, and simultaneously dispensing the flowable food product into the cells to completely fiill the same, removing the product dispensing members from the cells and engaging each cell with a heat sealing medium adjacent the openings through which the product dispensing elements passed to thereby close said openings and thereafter heating said packaged products to at least partially cook the same.

5. Process for forming and packaging a raw flowable food product comprising:

moving a pair of similar elongate webs of flexible substantially impervious, plastic packaging material through a predetermined path of travel, each web having a plurality of spaced-apart similar elongate concavities in one surface thereof spaced inwardly of the longitudinal marginal edges of the webs, bringing said webs into contacting relation with each other so that each concavity of one web faces and registers with the concavity of the other web and defines therewith an elongate packaging cell, heat sealing the contacting marginal portions of the webs together and also heat sealing together those portions of the webs which circumscribe each pair of registering concavities to seal each packaging cell from each other and to produce multi-cell packaging units, simultaneously puncturing and inserting a plurality of product dispensing elements connected to a source of raw flowable food products into the adjacent ends of a plurality of packaging cells, and simultaneously puncturing and inserting a plurality of vacuum producing elements connected to a source of negative pressure into the adjacent opposite ends of the packaging cells to produce a negative pressure within the cells, simultaneously withdrawing the vacuum elements from the cells while simultaneously dispensing the food product from the dispensing elements as the latter are withdrawn from the cells to completely fill the same, engaging the cells with a heat sealing medium adjacent the openings through which the product dispensing elements and vacuum producing elements passed to thereby close said openings, and thereafter heating said packaged products to at least partially cook the same.

6. Apparatus for forming and packaging a raw flowable food product comprising:

a package forming mechanism for moving a pair of similar elongate webs of flexible substantially impervious plastic packaging material into contacting relation with each other, each web having a plurality of spaced-apart similar concavities in one surface thereof spaced inwardly of the longitudinal edges of the webs, said mechanism including heating means for heat sealing the contacting marginal edge portions of the webs together and also sealing together those portions of the webs which circumscribe each concavity so that multi-cell packaging units are formed wherein each packaging cell of each unit is sealed one from another, means for moving the multi-cell packaging units in a predetermined path of travel, a manifold product dispensing mechanism including a material dispensing housing connected to a source of raw flowable food product, a plurality of elongate hollow dispensing needles connected to said housing in communicating relation therewith, means operatively connected with said housing for advancing the same towards the packaging units and for retraction thereof, said dispensing needles penetrating a plurality of packaging cells when said housing is advanced towards the packaging units whereby the flowable food product may be simultaneously dispensed into the packaging cells to completely fill the same, means for engaging the cells with a heat sealing medium adjacent the openings through which said penetrating dispensing needles passed for closing said openings, and means for heating the packaged product to at least partially cook the same.

7. The apparatus as defined in claim 6 and a vacuum producing mechanism including a housing connected in communicating relation to a source of negative pressure, a plurality of elongate hollow vacuum elements connected in communicating relation to said last mentioned housing, and mechanism operatively connected to said vacuum producing mechanism for advancing said last mentioned housing towards the packaging units, and for retraction of the vacuum housing away from said packaging units, said elongate hollow vacuum elements simultaneously penetrating a plurality of the packaging cells when said vacuum housing is advanced towards said packaging units and producing a partial vacuum within the cells simultaneously during dispensing of the flowable food product from said dispensing mechanism.

References Cited

UNITED STATES PATENTS 2,757,843  8/1956  Smith _____ 99—171
2,949,712  8/1960  Bieberdorf et al. _____ 53—37 X HYMAN LORD, Primary Examiner U.S. Cl. X.R.

53—22, 29, 112, 183; 99—174, 180